(12) United States Patent
Miller et al.

(10) Patent No.: US 11,247,349 B2
(45) Date of Patent: *Feb. 15, 2022

(54) CABLE CARRIER CROSSOVER SUPPLYING FOUR NON-STATIC LOCATIONS

(71) Applicant: The Boeing Company, Chicago, IL (US)

(72) Inventors: John Eric Miller, Ladson, SC (US); Dennis R. Mathis, Charleston, SC (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/862,863

(22) Filed: Apr. 30, 2020

(65) Prior Publication Data
US 2020/0254630 A1 Aug. 13, 2020

Related U.S. Application Data

(63) Continuation of application No. 15/418,297, filed on Jan. 27, 2017, now Pat. No. 10,675,769.

(51) Int. Cl.
| | |
|---|---|
| *B25J 19/00* | (2006.01) |
| *H02G 11/00* | (2006.01) |
| *B64F 5/10* | (2017.01) |
| *B25J 5/02* | (2006.01) |
| *B25J 9/00* | (2006.01) |

(52) U.S. Cl.
CPC ............ *B25J 19/0025* (2013.01); *B25J 5/02* (2013.01); *B25J 9/0009* (2013.01); *B25J 9/0084* (2013.01); *B25J 9/0096* (2013.01); *B64F 5/10* (2017.01); *H02G 11/00* (2013.01); *G05B 2219/39083* (2013.01)

(58) Field of Classification Search
CPC ........ B25J 19/0025; B25J 5/02; B25J 9/0009; B25J 9/0084; B25J 9/0096; B64F 5/10; H02G 11/00; G05B 2219/39083
See application file for complete search history.

(56) References Cited

U.S. PATENT DOCUMENTS

| | | |
|---|---|---|
| 4,155,468 A | 5/1979 | Royce |
| 5,018,923 A | 5/1991 | Melan et al. |
| (Continued) | | |

FOREIGN PATENT DOCUMENTS

| | | |
|---|---|---|
| CA | 2894299 | 1/2016 |
| CN | 1432509 | 7/2003 |
| (Continued) | | |

OTHER PUBLICATIONS

Non-Final Office Action dated Oct. 31, 2019 for U.S. Appl. No. 15/418,391.

(Continued)

*Primary Examiner* — David P Bryant
*Assistant Examiner* — Nirvana Deonauth
(74) *Attorney, Agent, or Firm* — Gates & Cooper LLP

(57) ABSTRACT

A method and apparatus for supplying cables to robots at non-static locations. A work platform for supporting one or more humans is positioned above a base platform for supporting one or more are robots independently of the work platform. A cable carrier system for providing cables to the robots is positioned underneath the work platform and above the base platform.

26 Claims, 13 Drawing Sheets

(56) References Cited

U.S. PATENT DOCUMENTS

| | | | |
|---|---|---|---|
| 5,359,542 | A | 10/1994 | Pahmeier et al. |
| 5,848,458 | A | 12/1998 | Bullen |
| 8,029,710 | B2 | 10/2011 | Khoshnevis |
| 8,468,699 | B2 | 6/2013 | Frauen et al. |
| 2010/0025349 | A1 | 2/2010 | Khoshnevis |
| 2010/0187356 | A1 | 7/2010 | Guering et al. |
| 2012/0053726 | A1 | 3/2012 | Peters et al. |
| 2012/0191243 | A1 | 7/2012 | Haas et al. |
| 2015/0003927 | A1 | 1/2015 | Spshak et al. |
| 2015/0343473 | A1 | 12/2015 | Mathis |
| 2016/0011593 | A1* | 1/2016 | Oberoi ............. G05B 19/41805 701/23 |
| 2016/0151906 | A1 | 6/2016 | Chromik et al. |
| 2016/0302989 | A1 | 10/2016 | Lodoca |
| 2017/0057081 | A1 | 3/2017 | Krohne et al. |

FOREIGN PATENT DOCUMENTS

| | | | |
|---|---|---|---|
| CN | 101341067 | 1/2009 | |
| CN | 101341067 | 6/2011 | |
| CN | 102341220 | 2/2012 | |
| CN | 102224068 | 4/2014 | |
| CN | 105406406 | 3/2016 | |
| CN | 205 852 774 | 1/2017 | |
| CN | 205852774 | 1/2017 | |
| CN | 105312196 | 3/2019 | |
| DE | 202015101427 | 1/2016 | |
| DE | 202015101427 | 6/2016 | |
| DE | 202015101427 | 7/2016 | |
| GB | 2 228 893 | 9/1990 | |
| GB | 2228893 | 9/1990 | |
| JP | 0537897 | 5/1993 | |
| JP | H05 37897 | 5/1993 | |
| JP | 2003262500 A | 9/2003 | |
| JP | 2016016511 | 2/2016 | |
| JP | 2016107382 A | 6/2016 | |
| RU | 2418722 | 5/2011 | |
| RU | 2566179 | 10/2015 | |
| WO | 2014209516 | 12/2014 | |
| WO | 2017/064301 | 4/2017 | |
| WO | WO-2017064301 A * | 4/2017 | ............. A61B 34/71 |

OTHER PUBLICATIONS

Canadian Office Action dated Mar. 25, 2021 for Canadian Patent Application No. 2,990,658.
Chinese Office Action dated Mar. 25, 2020 for CN Application No. 201810071580.1.
Chinese Office Action (with English translation) dated Jul. 26, 2019 for Chinese Patent Application No. 201810072240.0.
EPO Search Report dated Jun. 19, 2018 for European Patent Application No. 18153244.1.
EPO Search Report dated Jun. 19, 2018 for European Patent Application No. 18153300.1.
EPO Search Report dated Jun. 19, 2018 for European Patent Application No. 18153310.0.
EPO Search Report dated Jun. 26, 2018 for European Patent Application No. 18153203.7.
Non-Final Office Acton dated Feb. 19, 2019 for U.S. Appl. No. 15/418,379.
EPO Search Report and Written Opinion dated Dec. 4, 2017 for application No. NL 2018458.
Notice of Allowance dated Jun. 25, 2020 for U.S. Appl. No. 15/418,391.
EPO Search Report dated May 30, 2018 for European Patent Application No. 18153244.1.
EPO Search Report dated May 30, 2018 for European Patent Application No. 18153300.1.
EPO Search Report dated May 30, 2018 for European Patent Application No. 18153310.0.
EPO Search Report dated May 30, 2018 for European Patent Application No. 18153203.7.
Chinese Office Action dated Aug. 11, 2020 for application No. CN 201810071580.1.
Non-Final Office Acton dated Feb. 20, 2019 for U.S. Appl. No. 15/418,391.
Extended European Search Report dated Jul. 15, 2019 for EP Application No. 19162435.2.
EPO Search Report and Written Opinion dated Dec. 13, 2017 for application No. 2018441.
EPO Search Report and Written Opinion dated Dec. 12, 2017 for application No. NL 2018471.
Russian Office Action (with English translation) dated Apr. 28, 2021 for Russian Patent Application No. 2017144887/11.
Japanese Notice of Reasons of Rejection dated Aug. 2, 2021 for Japanese Application No. 2018-011597.
Canadian Office Action dated Nov. 16, 2021 for Canadian Patent Application No. 2,990,658.

* cited by examiner

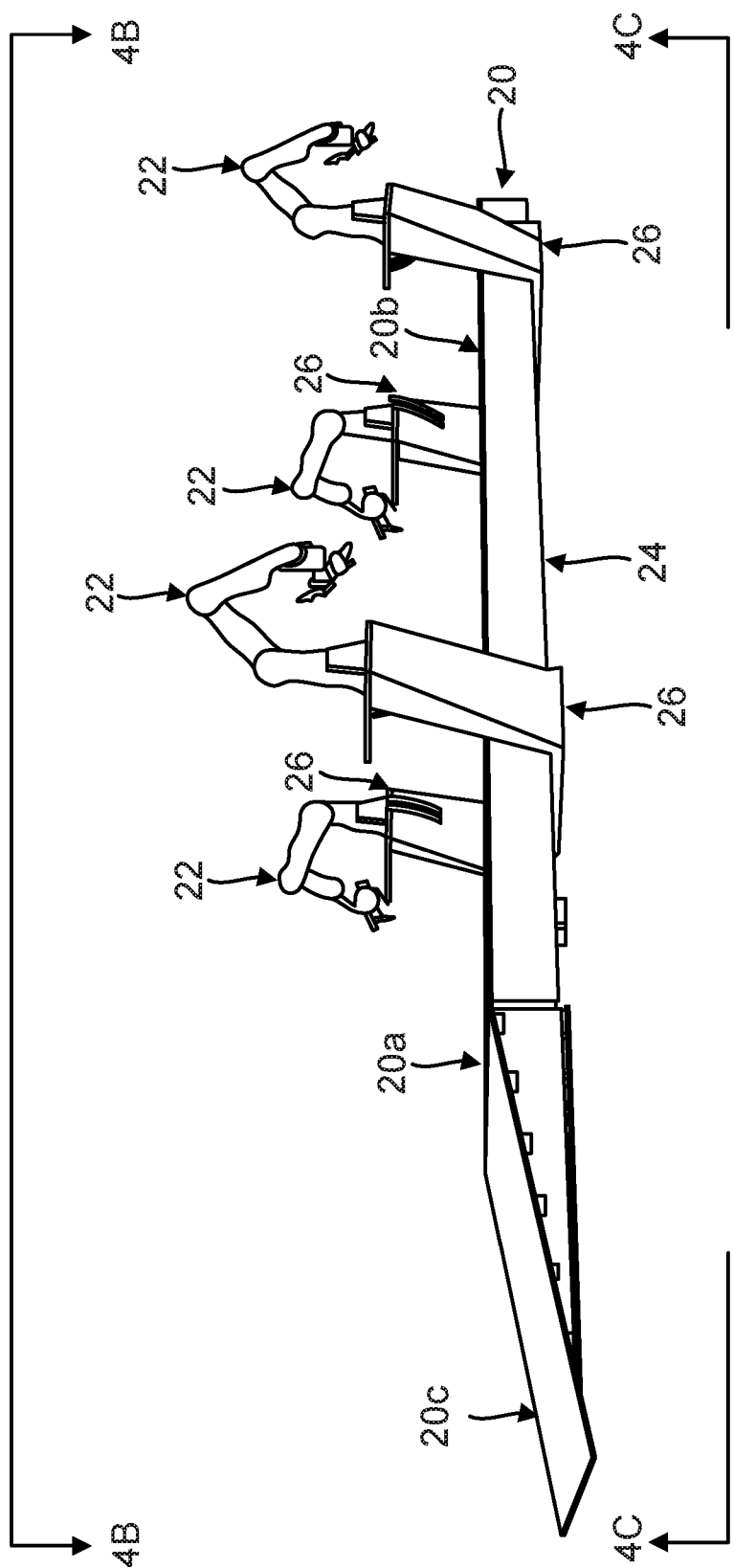

CABLE CARRIER CROSSOVER SUPPLYING FOUR NON-STATIC LOCATIONS

CROSS REFERENCE TO RELATED APPLICATIONS

This application is a continuation under 35 U.S.C. Section 120 of the following and commonly-assigned application:

U.S. Utility application Ser. No. 15/418,297, filed on Jan. 27, 2017, by John Miller and Dennis Mathis, entitled "CABLE CARRIER CROSSOVER SUPPLYING FOUR NON-STATIC LOCATIONS," now U.S. Pat. No. 10,675,769, issued Jun. 9, 2020; and which application is incorporated by reference herein.

This application is related to the following and commonly-assigned application:

U.S. Utility application Ser. No. 15/418,284, filed on Jan. 27, 2017, by John Miller and Dennis Mathis, entitled "ISOLATED HUMAN WORK PLATFORM FOR STABILIZED POSITIONING OF COLLABORATIVE ROBOTICS," now U.S. Pat. No. 10,344,906, issued Jul. 9, 2019;

U.S. Utility application Ser. No. 15/418,379, filed on Jan. 27, 2017, by John Miller and Dennis Mathis, entitled "BELT DRIVE DUAL ROBOT GANTRY," now U.S. Pat. No. 10,745,251 issued Aug. 18, 2020; and U.S. Utility application Ser. No. 15/418,391, filed on Jan. 27, 2017, by John Miller and Dennis Mathis, entitled "SYSTEM FOR FOUR COLLABORATIVE ROBOTS AND HUMANS IN A NARROWING WORK ENVELOPE," now U.S. Pat. No. 10,815,679, issued Oct. 27, 2020;

all of which applications are incorporated by reference herein.

BACKGROUND INFORMATION

1. Field

The disclosure is related generally to robotics and more specifically to an isolated human work platform for stabilized positioning of collaborative robotics.

2. Background

Aircraft manufacturers typically rely on work cell automation during the build process for a fuselage assembly. A typical work cell includes a workstand and one or more cradle fixtures to hold and position the fuselage assembly. Currently, robots are used outside the fuselage assembly, and some work inside the fuselage assembly is performed by robots as well. However, it is desired to increase the use of robots inside the fuselage assembly, as well provide humans with safe access while the robots operate within the fuselage assembly.

However, platforms used inside the fuselage assembly are not isolated and, as a result, end-of-arm tooling on robots inside the fuselage assembly may bounce or otherwise be impacted due to platform movement caused by human or machine motion nearby, which results in the end-of-arm tooling on the robots being in the wrong location or position.

There is a need, then for a work platform that allows humans to work safely inside the fuselage assembly, and that provides isolated support for human and machine motion without imparting any of that motion to the robots working inside the fuselage assembly.

SUMMARY

To overcome the limitations in the prior art described above, and to overcome other limitations that will become apparent upon reading and understanding the present specification, the present disclosure describes a method and apparatus for supplying cables to robots at non-static locations.

A work platform for supporting one or more humans is positioned above a base platform for supporting one or more robots platform independently of the work platform. A cable carrier system for providing cables to the robots is positioned underneath the work platform and above the base platform.

The features, functions, and advantages that have been discussed can be achieved independently in various embodiments or may be combined in yet other embodiments further details of which can be seen with reference to the following description and drawings.

DRAWINGS

Referring now to the drawings in which like reference numbers represent corresponding parts throughout:

Figure 3A:
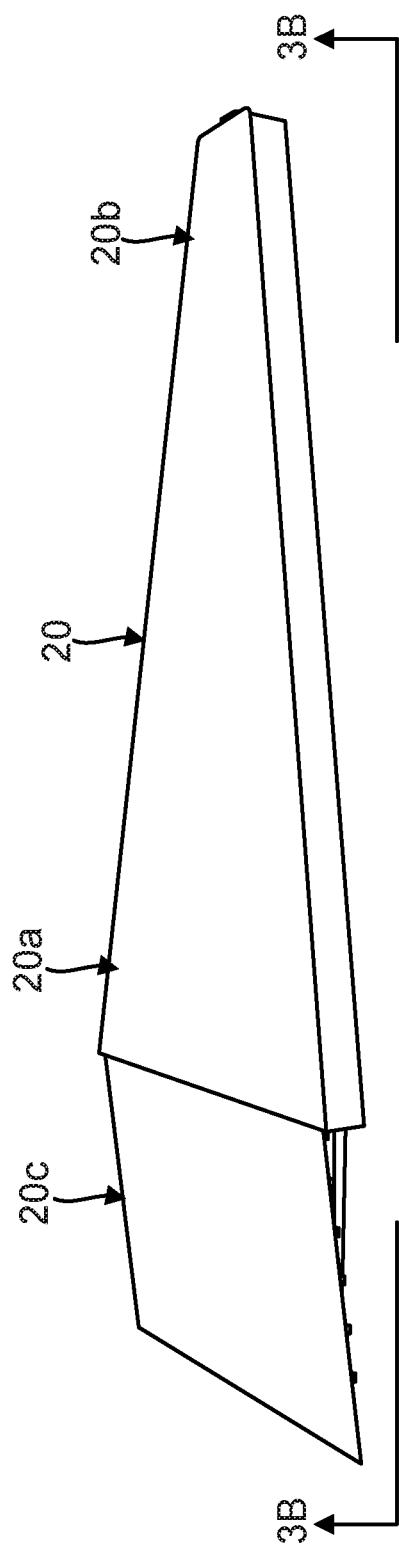
Figure 3B:
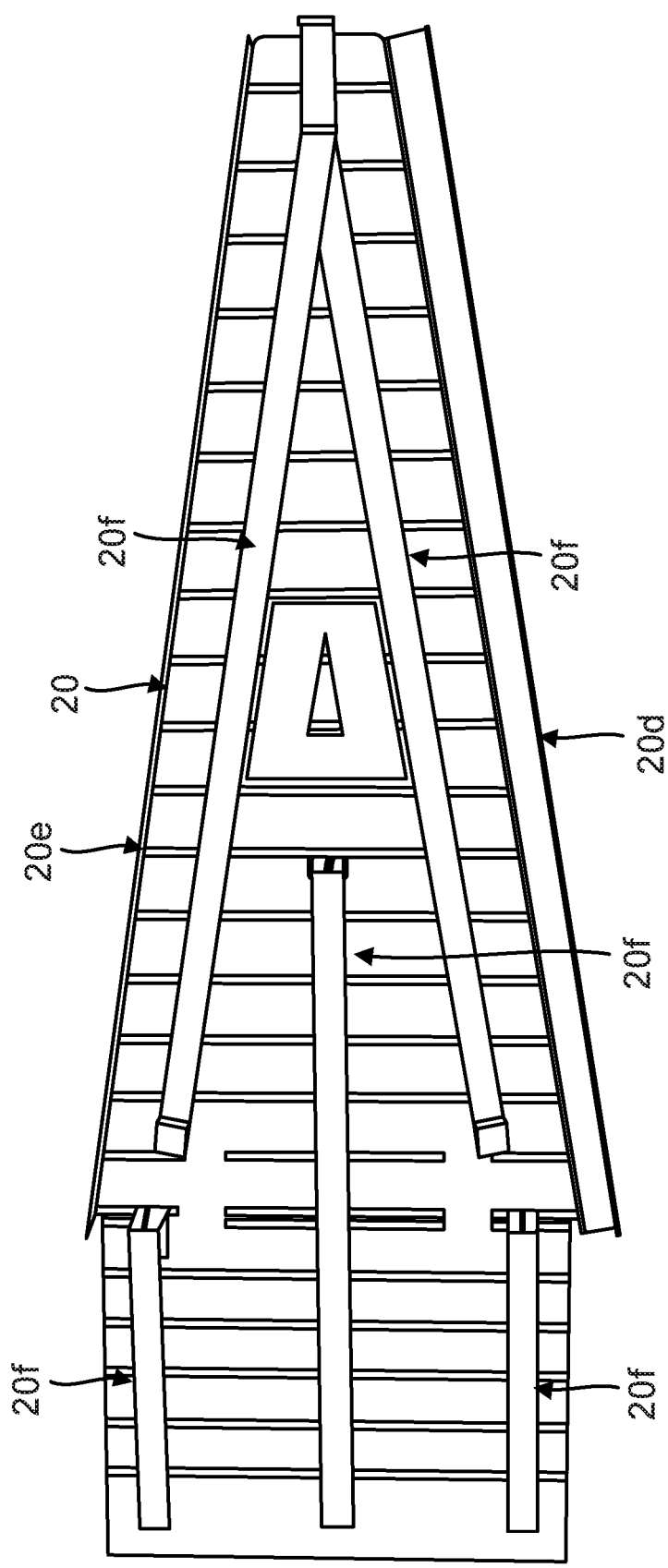

FIGS. 3A and 3B further illustrate a configuration of a work platform, according to one embodiment, wherein FIG. 3A is a side perspective view of the work platform and FIG. 3B is a bottom view of the work platform showing its underside.

Figure 4B:
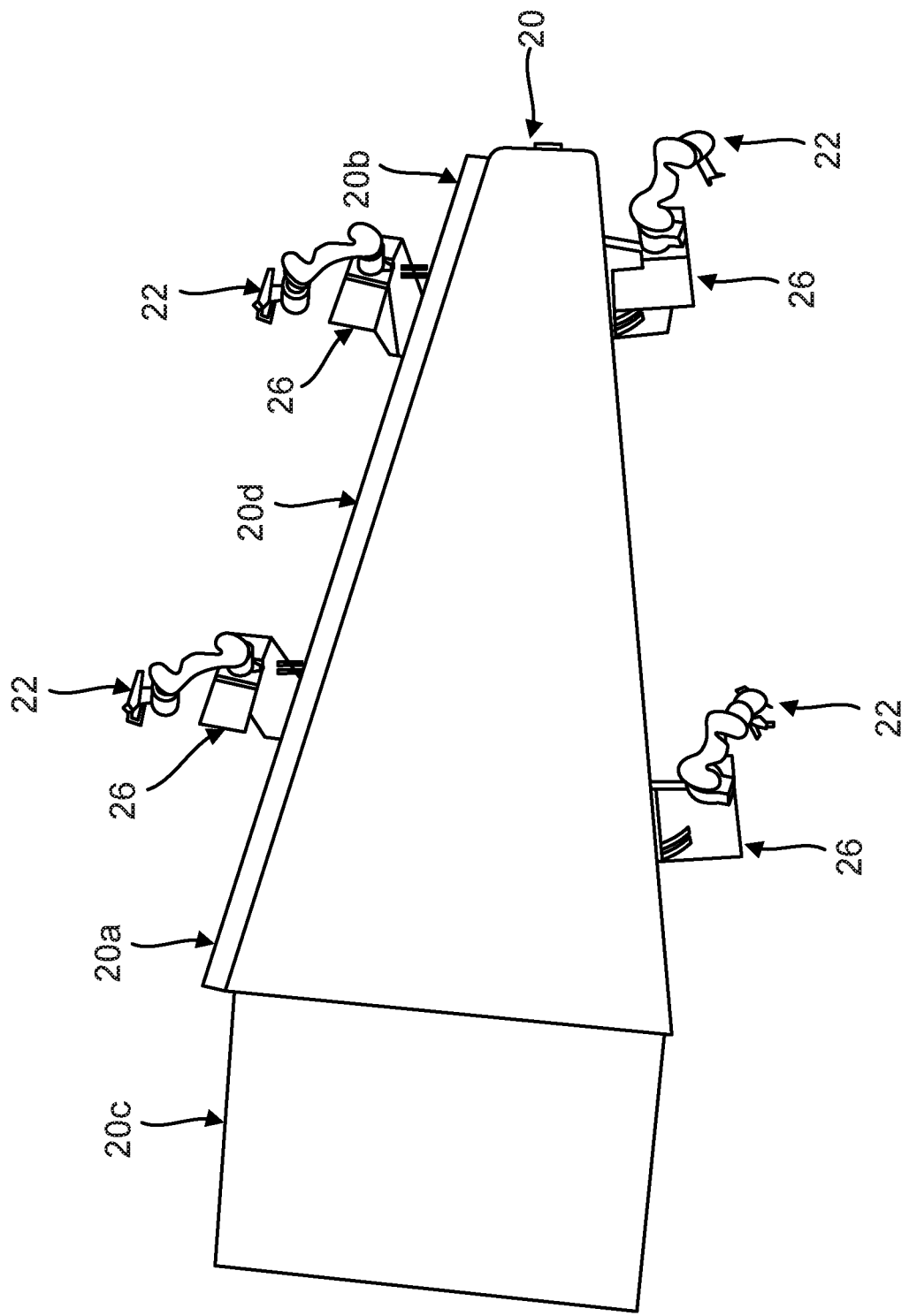
Figure 4C:
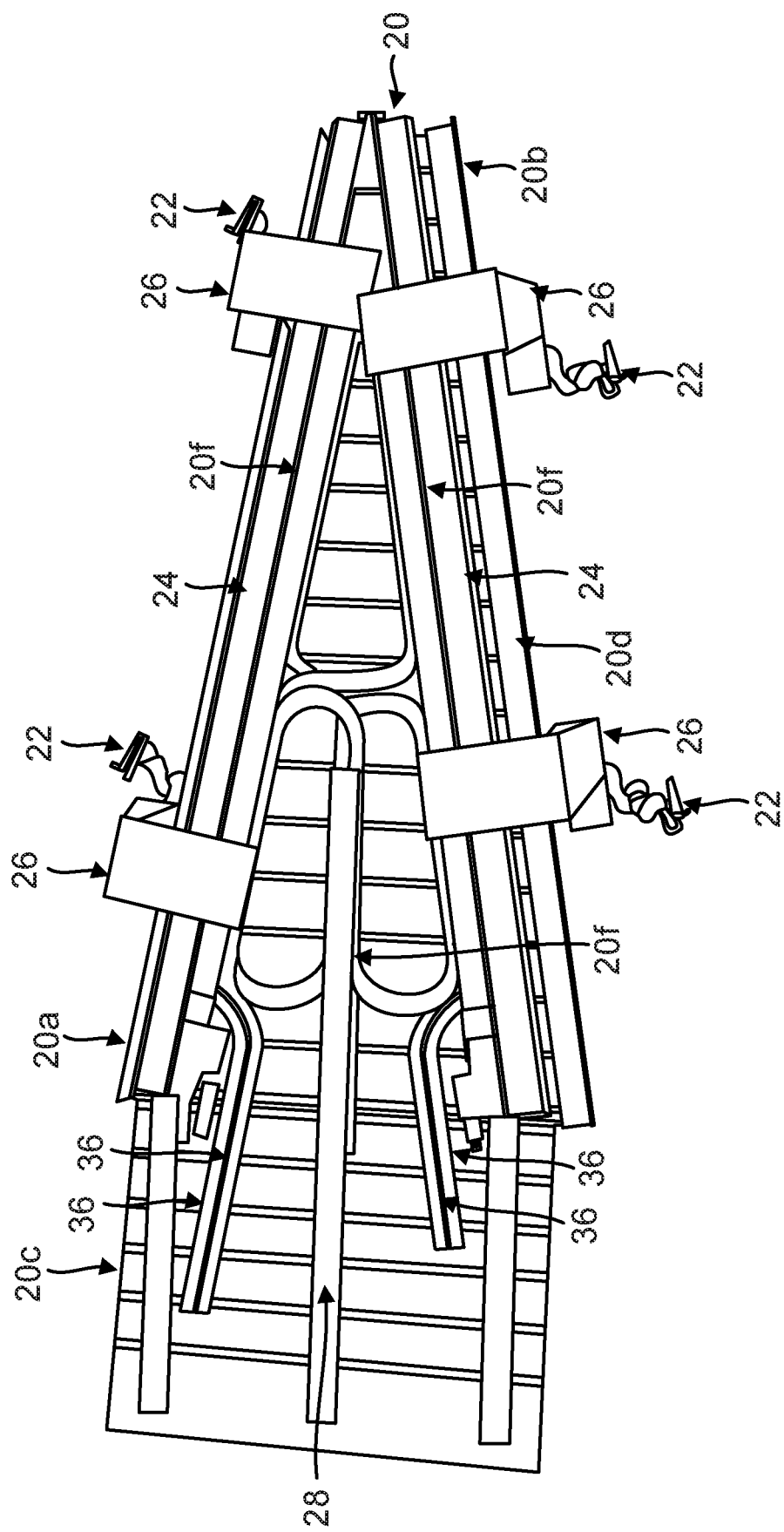

FIGS. 4A, 4B and 4C further illustrate the configuration of the work platform, robots, gantries and cable carrier system, according to one embodiment, wherein FIG. 4A is a side perspective view of the work platform, robots and gantries; FIG. 4B is a top view of the work platform, robots and gantries; and FIG. 4C is a bottom view of the work platform, robots, gantries and cable carrier system, showing their underside.

Figure 5:
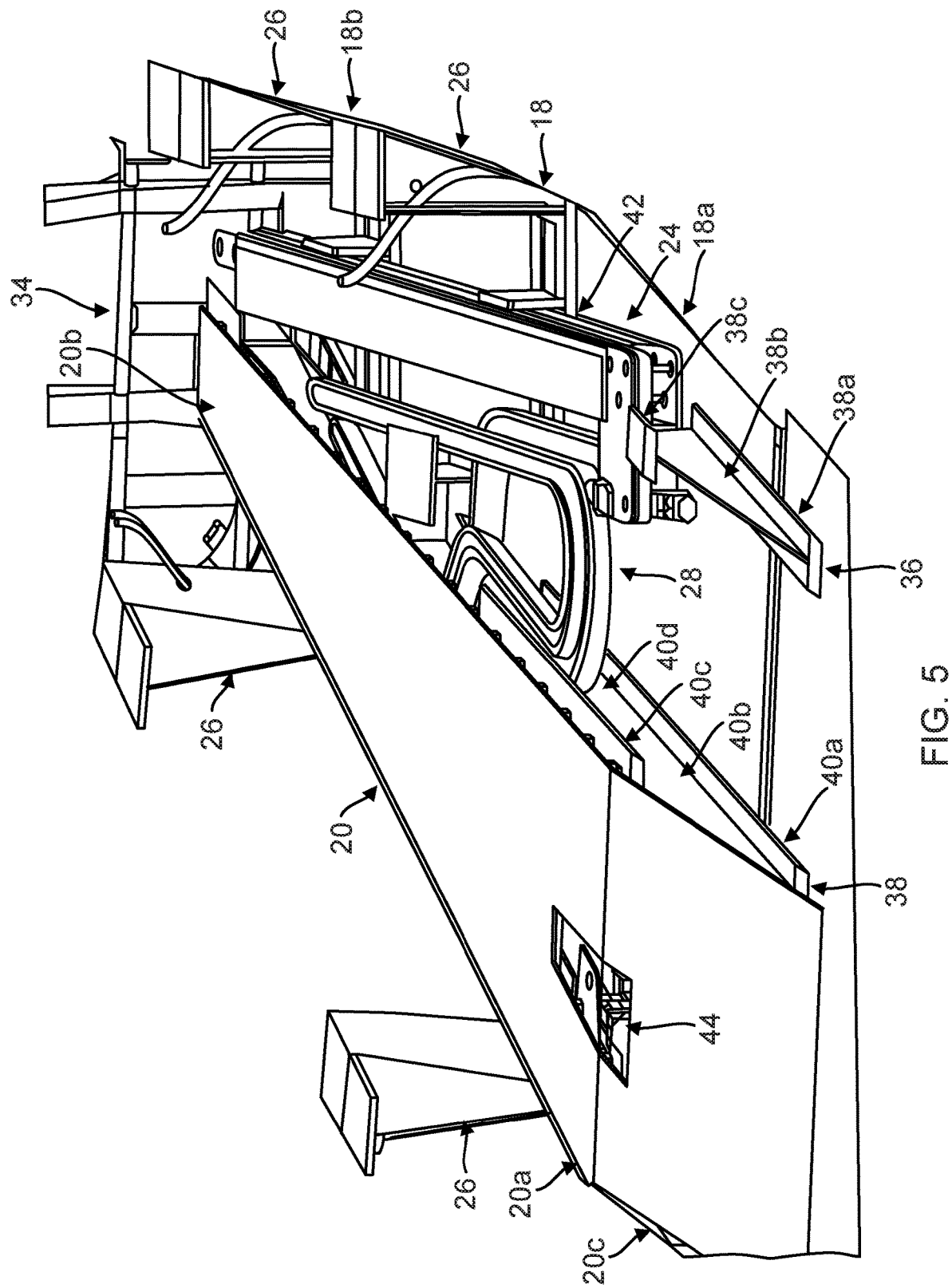

FIG. 5 is a cutaway view of the work platform positioned above the base platform, according to one embodiment, wherein the cutaway view shows only half of the work platform.

Figure 6:
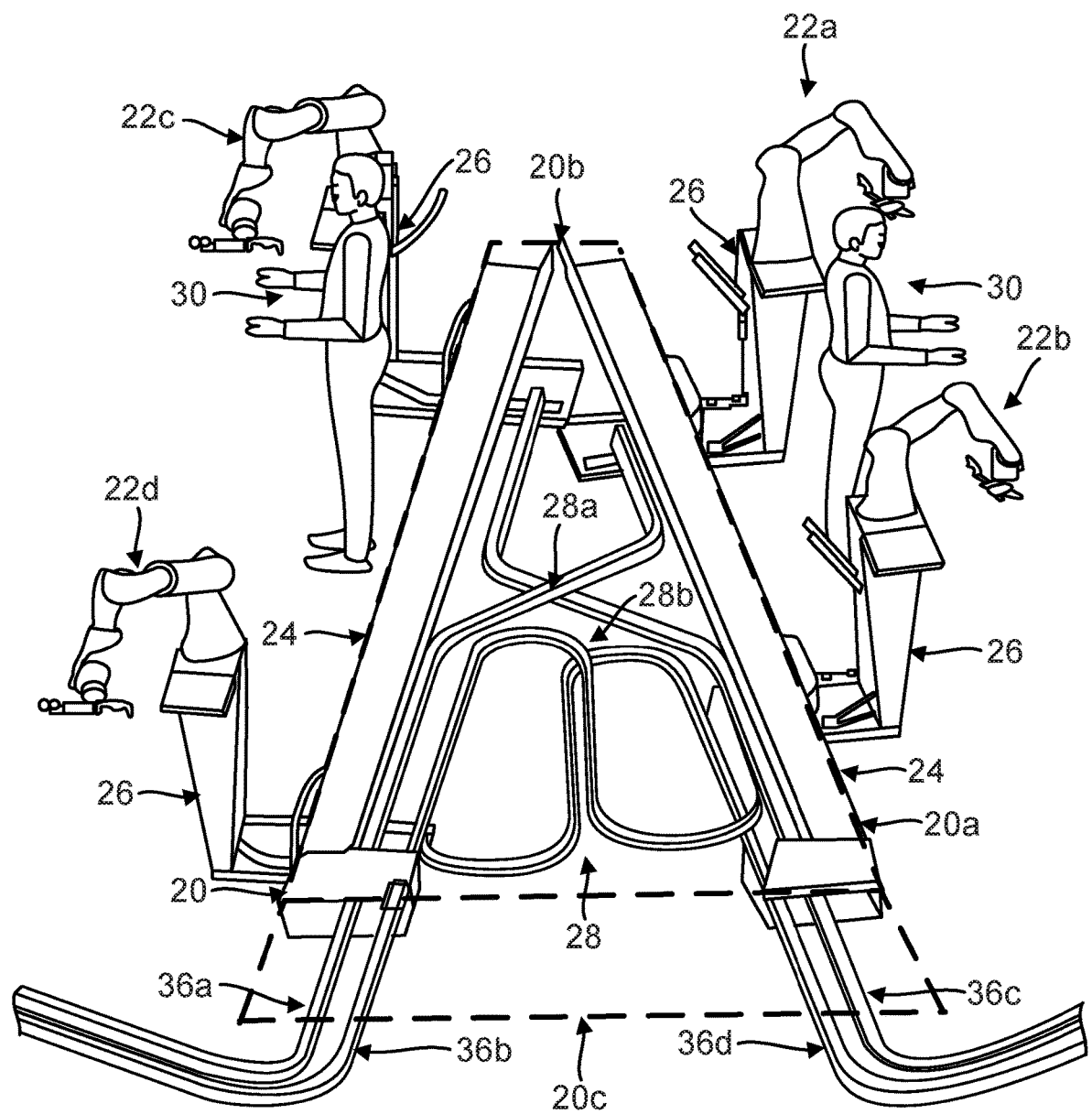

FIG. 6 provides a view where the work platform has been removed, according to one embodiment, leaving only the gantries, cable carrier system, individual support stands and robots.

Figure 7:
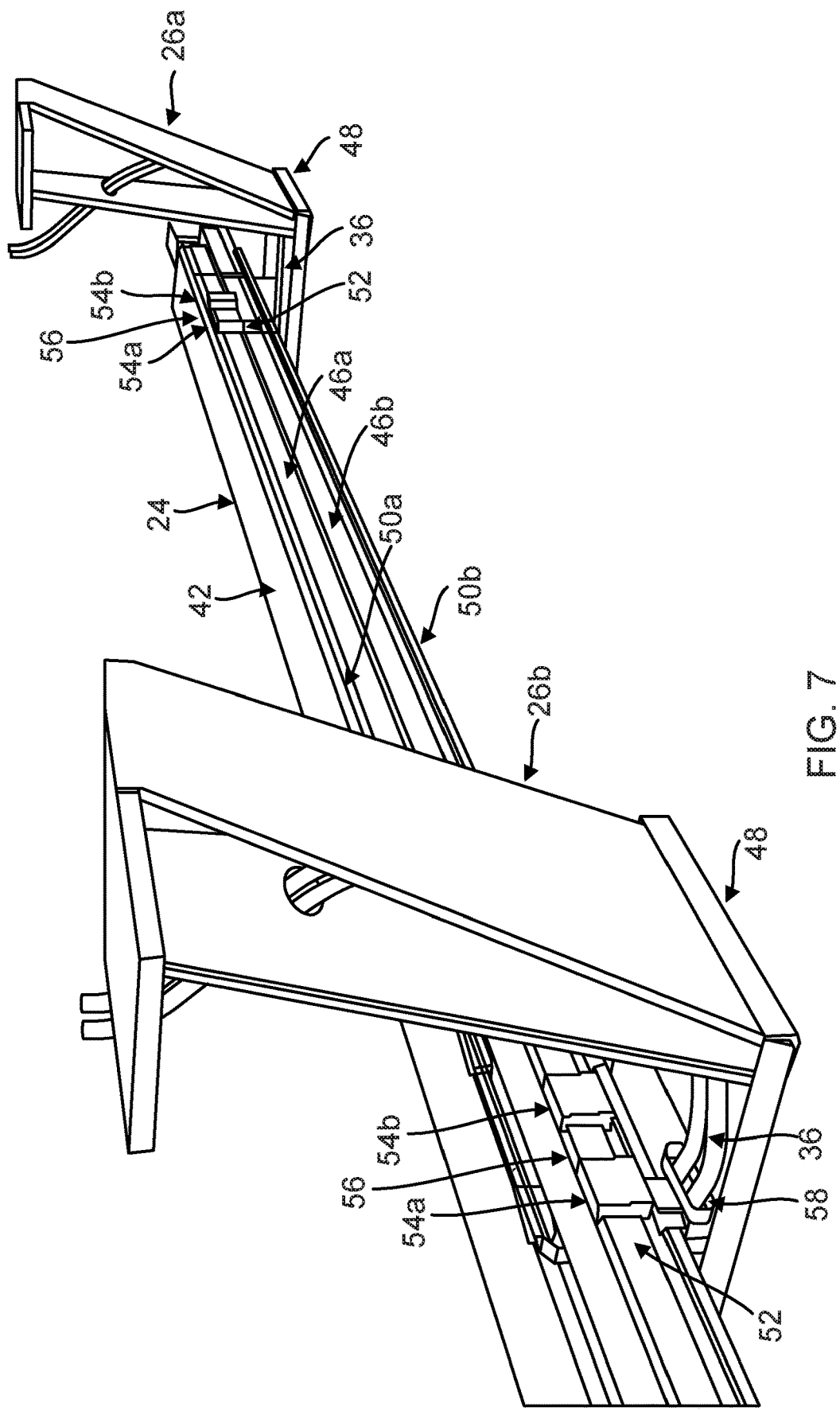

FIG. 7 is another view of the gantry on one side of the work platform, as well as the individual support stands attached to the gantry, with the robots omitted, according to one embodiment.

Figure 8:
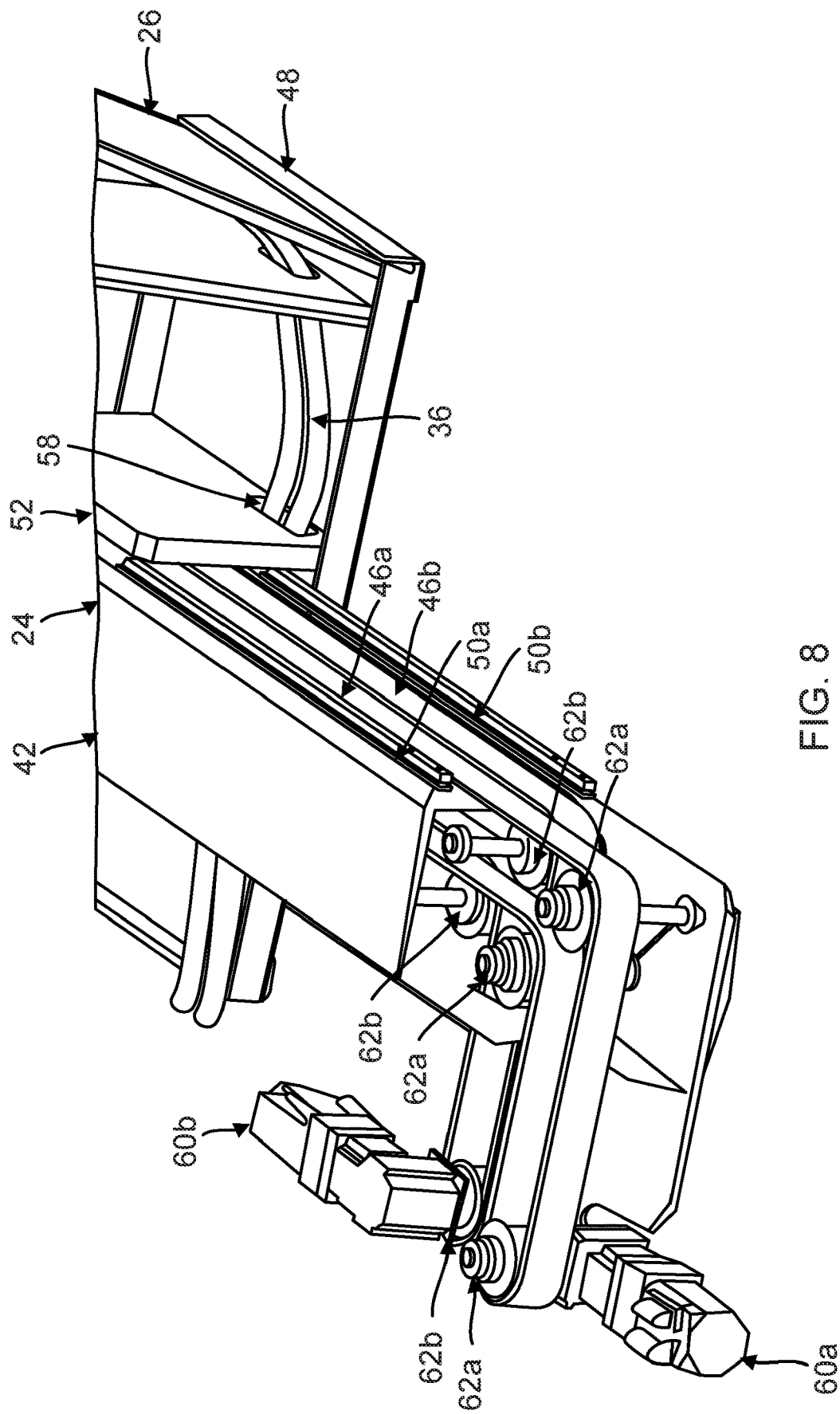

FIG. 8 is another view of the gantry on one side of the work platform, as well as the individual support stands attached to the gantry, showing details of the dual drive belts, according to one embodiment.

Figure 9:
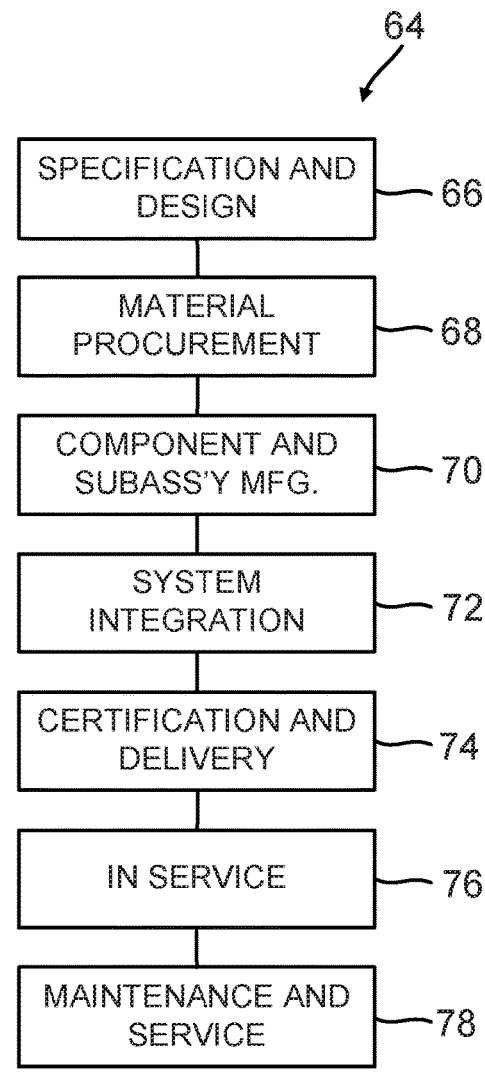

FIG. 9 illustrates the steps of an aircraft manufacturing and service method, according to one embodiment.

Figure 10:
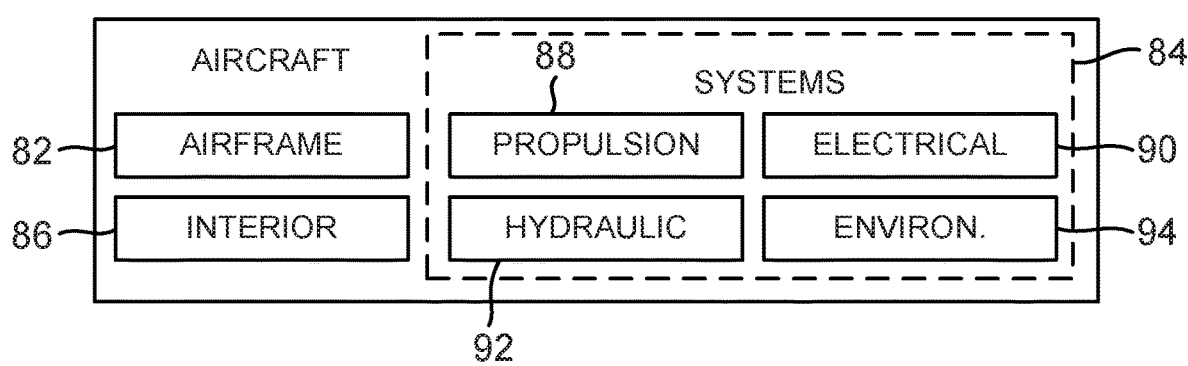

FIG. 10 illustrates an aircraft and its components, according to one embodiment.

DETAILED DESCRIPTION

In the following description, reference is made to the accompanying drawings which form a part hereof, and in which is shown by way of illustration a specific example in which the disclosure may be practiced. It is to be understood that other examples may be utilized and structural changes may be made without departing from the scope of the present disclosure.

Figure 1:
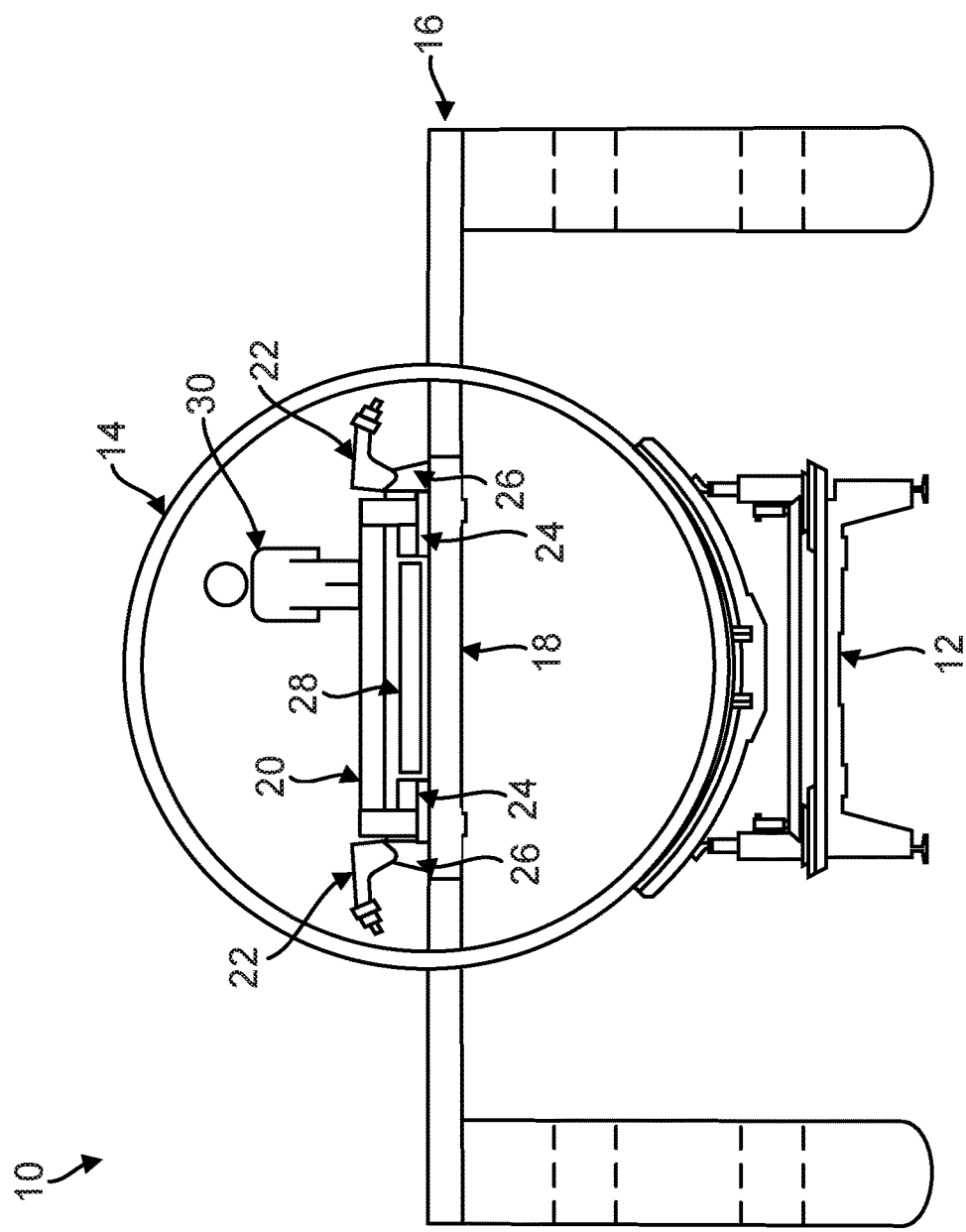
FIG. 1 illustrates a typical work cell layout for assembly of an aircraft fuselage, according to one embodiment.

FIG. 1 illustrates a typical work cell 10 layout that includes one or more cradle fixtures 12 to hold and position a fuselage assembly 14 of an aircraft. Currently, robots are used outside the fuselage assembly 14, and some work inside the fuselage assembly 14 is performed by robots as well. However, it is desired to provide an apparatus for stabilized positioning of collaborative robotics inside the fuselage assembly 14.

In this disclosure, the fuselage assembly 14 is positioned adjacent a workstand 16 that includes a base platform 18 positioned inside the fuselage assembly 14. (Some of the support structures for the workstand 16 are omitted from this view in the interests of clarity.) The base platform 18 is independently supported within the fuselage assembly 14 by the workstand 16.

A work platform 20, which is an isolated motion platform, is positioned relative to the base platform 18. In one embodiment, the work platform 20 is positioned above the base platform 18.

One or more robots 22 are positioned inside the fuselage assembly 14 and supported on the base platform 18 independently of the work platform 20, so that any movement of the work platform 20, for example, flexing or shaking due to movement on the work platform 20 does not affect the position of the robots 22 or the base platform 18.

The robots 22 are supported independently of the work platform 20 on gantries 24 positioned on both sides of the work platform 20. The gantries 24 are mounted on and supported by the base platform 18 independently of the work platform 20. The gantries 24, positioned above the base platform 18 and underneath the work platform 20, are used for positioning the robots 22 along a length of the work platform 20. The robots 22 are placed on individual support stands 26, which are mounted on the gantries 24.

The robots 22 are provided with power, control and communication, as well as parts supply and return, via a cable carrier system 28. The cable carrier system 28 is positioned on or above the base platform 18 and underneath the work platform 20 to provide a compact solution for supplying the robots 22.

The work platform 20 has a profile height above the base platform 18 inside of the fuselage assembly 14. This profile height allows humans 30 to access the inside of the fuselage assembly 14 while standing on the work platform 20. In one embodiment, the profile height is 12 inches or less, although other embodiments may have a profile height that is more than 12 inches.

At the same time, the work platform 20 sets the humans 30 at the correct height to easily reach areas of work in the fuselage assembly 14. Moreover, the fuselage assembly 14 may be rotated, so that the humans 30 can reach upper or lower areas of work in the fuselage assembly 14. In one example, there is no need for ladders when the humans 30 work in the fuselage assembly 14.

The robots 22 and individual support stands 26 are positioned on the gantries 24 slightly above the base platform 18, and extend above the work platform 20 to a height necessary to position the robots 22 for an optimum reach within a work area. In one embodiment, the robots 22 and individual support stands 26 have a combined height of about 30 inches, which is about 18 inches above the 12 inch height of the work platform 20, although other embodiments may have a combined height that is less or more than 30 inches.

The base platform 18 and work platform 20 together provide a collaborative workspace for the robots 22 and humans 30 within the fuselage assembly 14. The work platform 20 is isolated from the robots 22 for stabilized positioning of the robots 22. Specifically, the work platform 20 provides isolated support for movement thereon without imparting any motion to the robots 22, thereby eliminating positioning errors caused by flexing, vibrations or fluctuations in the work platform's 20 height due to movement of the work platform 20.

Figure 2A:
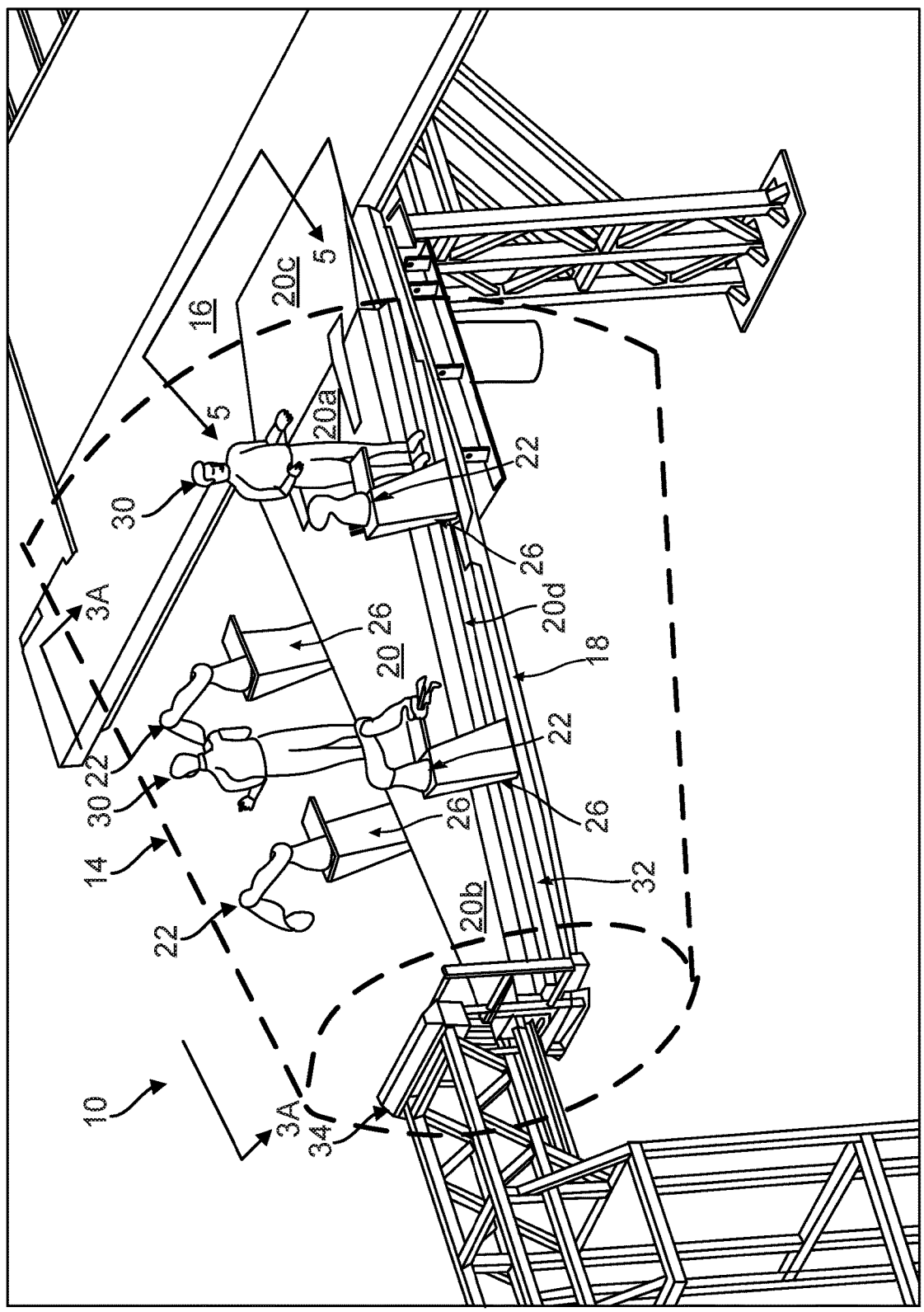
FIGS. 2A and 2B are perspective side and top views of the work cell layout, according to one embodiment.
Figure 2B:
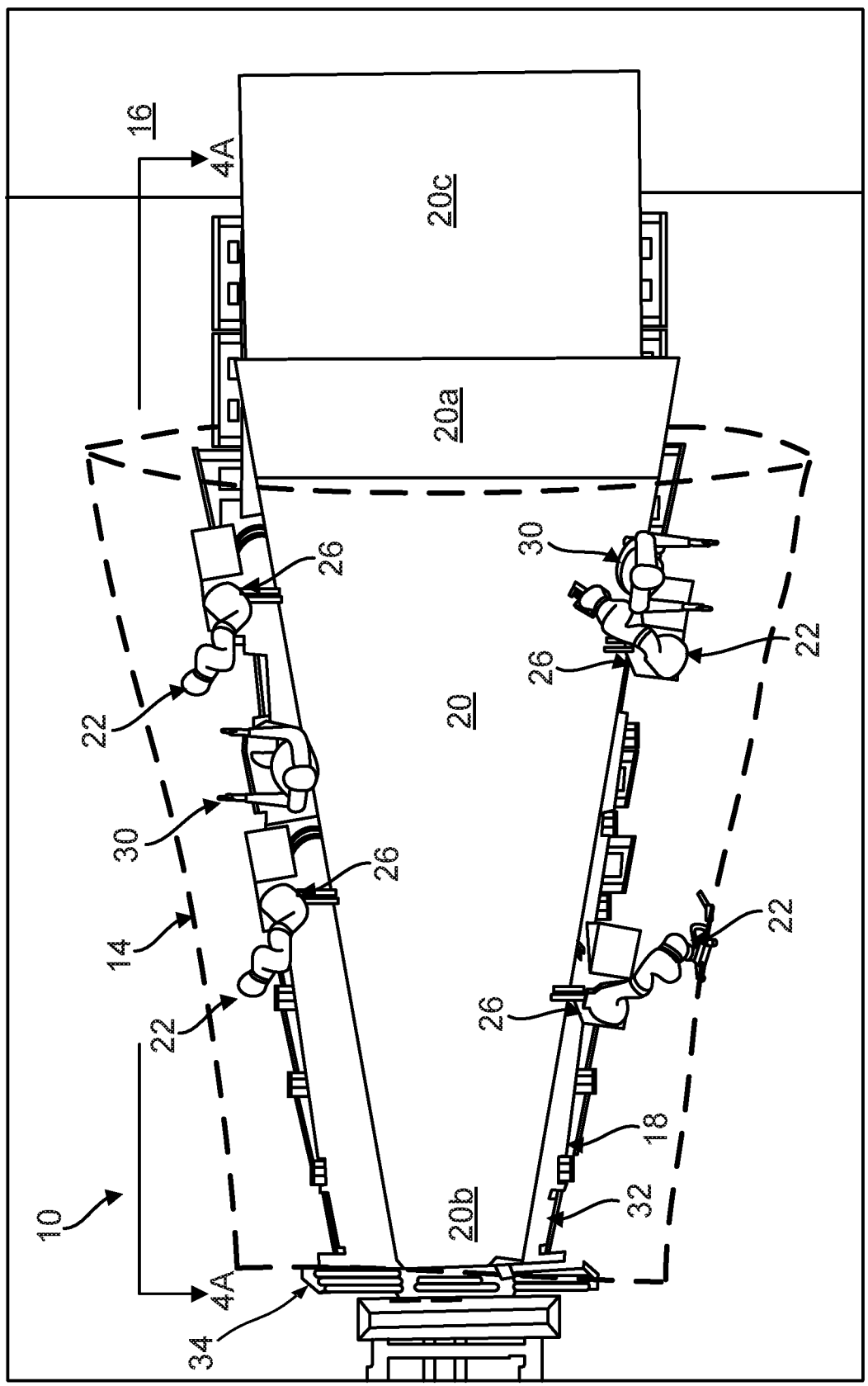

FIGS. 2A and 2B are perspective side and top views of the work cell 10 layout, respectively, with the cradle fixture 12 and fuselage assembly 14 omitted, wherein the shape and position of the fuselage assembly 14 are indicated by dashed lines. These figures show the workstand 16 positioned at one end of the fuselage assembly 14 to independently support the base platform 18, as well as the work platform 20, both of which are suspended within the fuselage assembly 14.

These views illustrate an apparatus for supporting four collaborative robots 22 and humans 30 in a narrowing work envelope, for example, an aft/tail section and a nose section of the fuselage assembly 14. Specifically, in one embodiment, the work platform 20 is narrower than the base platform 18. The work platform 20 is positioned relative to the base platform 18 to provide areas 32 for moving or positioning the robots 22 and individual support stands 26, as well as humans 30, on one or more sides of the work platform 20.

The work platform 20 is tapered along its length, to fit the narrowing fuselage assembly 14, with a front end 20a that is wider than a back end 20b. The front end 20a of the work platform 20 is positioned at a forward end of the fuselage assembly 14 and the back end 20b of the work platform 20 is positioned at an aft end of the fuselage assembly 14.

The tapered configuration of the work platform 20 is used to expose areas 32 of the base platform 18 sufficient for the robots 22 and humans 30 to traverse the base platform 18 and maneuver around the work platform 20 for times when the robots 22 need to be serviced or inspected in position. This tapered configuration also allows the use of the same robots 22 for tapered as well as cylindrical sections of the fuselage assembly 14.

In another embodiment, the work platform 20 has a straight configuration, rather than a tapered configuration. This straight configuration could be used for cylindrical sections of the fuselage assembly 14.

Once the fuselage assembly 14 is in position, an end-of-platform support 34 is positioned and interlocked to the back end 20b of the work platform 20 to secure the position of the work platform 20. In one embodiment, the end-of-platform support 34 comprises a structure that is itself supported independently of the workstand 16 and base platform 18.

The work platform 20 also includes a ramp portion 20c, adjacent the front end 20a, that is secured through the base platform 18 and the workstand 16, wherein the ramp portion 20c promotes human 30 and tool cart access to the work platform 20. In addition, a ledge 20d is provided along one (or both) sides of the work platform 20 for humans 30 to stand on.

FIGS. 3A and 3B further illustrate the configuration of the work platform 20. FIG. 3A is a side perspective view of the work platform 20, taken on the line 3A-3A of FIG. 2A looking in the direction of the arrows; and FIG. 3B is a bottom view of the work platform 20 showing its underside, taken on the line 3B-3B of FIG. 3A looking in the direction of the arrows.

In one embodiment, the work platform 20 has a tapered configuration, with the wider portion 20a (the front end 20a) at a forward end of the work platform 20 and the narrower portion 20b (the back end 20b) at an aft end of the work platform 20. The work platform 20 also includes the ramp portion 20c adjacent to the front end 20a, which angles downward from the work platform 20 to reside on or above the base platform 18 (not shown).

In addition, the work platform 20 has a planar top surface 20a, 20b, 20c as shown in FIG. 3A and a ribbed bottom surface 20e with longitudinal struts 20f as shown in FIG. 3B. FIG. 3b also shows the underside of the ledge 20d of the work platform 20.

FIGS. 4A, 4B and 4C further illustrate the configuration of the work platform 20, robots 22, gantries 24, individual support stands 26 and cable carrier system 28. FIG. 4A is a side perspective view of the work platform 20 (including the front end 20a, back end 20b and ramp 20c), robots 22, gantries 24 and individual support stands 26, taken on the line 4A-4A of FIG. 2B looking in the direction of the arrows; FIG. 4B is a top view of the work platform 20 (including the front end 20a, back end 20b, ramp 20c and ledge 20d), robots 22, gantries 24 and individual support stands 26, taken on the line 4B-4B of FIG. 4A looking in the direction of the arrows; and FIG. 4C is a bottom view of the work platform 20 (including the front end 20a, back end 20b, ramp 20c, ledge 20d and struts 20f), robots 22, gantries 24, individual support stands 26 and cable carrier system 28, taken on the line 4C-4C of FIG. 4A looking in the direction of the arrows.

In one embodiment, there are separate gantries 24 on each side of the work platform 20. Each of the robots 22 are placed upon an individual support stand 26 that is attached to their respective gantries 24. The robots 22 and the individual support stands 26 are fully supported by the gantries 24, which in turn are supported by the base platform 18 (not shown), and are not affected by motion of the work platform 20.

In designing the gantries 24, the need was identified to independently position two robots 22 on each side of the work platform 20 using only a single gantry 24. Current systems only allow for one robot to be positioned along a gantry 24. In this embodiment, the single gantry 24 allows for independent control to drive two robots 22 on one side of the work platform 20 to their respective specified locations using high precision.

Each of the two robots 22 on one side of the work platform 20 are moved laterally along the side of the work platform 20 via the single gantry 24. Specifically, the gantry 24 allows each of the robots 22 to travel a substantial portion of the length of the work platform 20 on one side of the work platform 20, except for the space occupied by the other robot 22, as well as the space on the opposite side of the other robot 22.

In one embodiment, the cable carrier system 28 is positioned at least partially underneath the work platform 20 and conforms to a tapered configuration of the work platform 20. The cable carrier system 28 provides a set of cables 36 for each of the robots 22. Although shown as individual elements, each of the cables 36 may comprise a bundle of power, control and communication cables, as well as parts supply and return tubes.

The cable carrier system 28 is designed to be integrated with the work platform 20, but can be used independently of it. In designing the cable carrier system 28, there were no available concepts for stacking and nesting two pairs of cables 36 that would provide service to four robots 22 in a narrowing tapered configuration, within a compact space between the base platform 18 and the work platform 20. The cable carrier system 28 provides a unique method for stacking and nesting pairs of the cables 36 to the robots 22 on each side of the work platform 20, while keeping the cables 36 from interfering with each other and still allowing for a full range of motion.

In addition, the longitudinal struts 20f of the work platform 20 support at least portions of the cables 36 above the base platform 18, for stacking the pairs of cables 36, so that they do not interfere with each other. Specifically, an upper cable 36 in a pair is supported by the longitudinal struts 20f above a lower cable 36 in the pair, which allows the upper cable 36 to glide over the lower cable and the lower cable 36 to glide under the upper cable 36, without the cables 36 making contact.

FIG. 5 is a cutaway view of the work platform 20 positioned above the base platform 18, wherein the cutaway view shows only the left half of the work platform 20, with the right half of the work platform 20 removed, taken on the line 5-5 of FIG. 2A looking in the direction of the arrows.

The front end 20a of the work platform 20 is mounted on one or more risers 38, 40 mounted on the base platform 18, while the back end 20b of the work platform 20 is cantilevered above the base platform 18. Once the fuselage assembly 14 is in position, the end-of-platform support 34 is positioned and interlocked to the back end 20b of the work platform 20 to secure the position of the work platform 20.

The riser 38 is also a support structure, and is comprised of a bottom flange 38a, a triangular-shaped vertical web element 38b, and a top flange 38c, wherein the triangular-shaped vertical web element 38b connects the bottom flange 38a to the top flange 38c. The bottom flange 38a is mounted on the base platform 18, and the work platform 20 is mounted on the top flange 38c.

Similarly, the riser 40 is a support structure, and is comprised of a bottom flange 40a, a triangular-shaped vertical web element 40b, and a top flange 40c, wherein the triangular-shaped vertical web element 40b connects the bottom flange 40a to the top flange 40c. The bottom flange 40a is mounted on the base platform 18, and the work platform 20 is mounted on the top flange 40c.

Note that only a portion of the riser 40 is shown with the right half of the work platform 20 removed, e.g., about half of the riser 40, with the remaining portion of the riser 40 hidden underneath the left half of the work platform 20. Note also that there is another riser 38 hidden underneath the left half of the work platform 20, wherein the hidden riser 38 is positioned on the opposite side of the riser 38 shown in FIG. 5.

The ramp portion 20c of the work platform 20 is also mounted on the risers 38, 40 to provide easy access from the base platform 18. The ramp portion 20c of the work platform 20 is supported on or above the triangular-shaped vertical web element 38b. The ramp portion 20c of the work platform 20 also is supported on or above the triangular-shaped vertical web element 40b.

The risers 38, 40 for the work platform 20 are positioned on the base platform 18 in such a way that they do not interfere with the gantries 24 or the cable carrier system 28. The risers 38, 40 allow the gantries 24 and the cable carrier system 28 to be positioned between the work platform 20 and the base platform 18.

In one embodiment, the riser 40 also includes a support section 40d for at least portions of the cables 36 positioned midway up the vertical web element 40b, for stacking the pairs of cables 36, so that they do not interfere with each other. Specifically, an upper cable 36 in a pair is supported by the support section 40d above a lower cable 36 in the pair, which allows the upper cable 36 to glide over the lower cable and the lower cable 36 to glide under the upper cable 36, without the cables 36 making contact.

As noted above, in one embodiment, there is one gantry 24 positioned adjacent to each inside edge of the work platform 20 for moving the robots 22 along a length of the work platform 20. The gantry 24 is constructed of a steel main square support tube 42 that is anchored near the riser 38 at one end, i.e., a forward end 18*a*, of the base platform 18, so that the weight of the gantry 24 is supported from the forward end 18*a* of the base platform 18. A remainder of the steel main square support tube 42 is cantilevered and positioned above the base platform 18 towards another end, i.e., an aft end 18*b*, of the base platform 18, so that the gantry 24 is isolated from motion of the work platform 20. The steel main square support tube 42 is then coupled to the end-of-platform support 34 at the aft end 18*b* of the base platform 18. Another gantry 24 is present on the left side of the work platform 20, in a mirror image of the gantry 24 shown, but is obscured by the work platform 20 in this view.

The work platform 20 also includes one or more removable access panels 44. In the example of FIG. 5, there is one access panel 44 in the left half of the work platform 20 shown, but there would be similarly placed access panel in the right half of the work platform 20 that is omitted. The removable access panels 44 are designed to provide access to components of the gantry 24 and cable carrier system 28 underneath the work platform 20, e.g., for repair, installation and/or removal.

FIG. 6 provides a view where the work platform 20 has been removed, but with its outline indicated in dashed lines, leaving only the robots 22, gantries 24, individual support stands 26 and cable carrier system 28.

The cable carrier system 28 maintains the cables 36*a*, 36*c*, 36*d* in a crossover configuration in the space between the base platform 18 and the work platform 20. Specifically, the cable carrier system 28 positions the four cables 36*a*, 36*b*, 36*c*, 36*d* to independently supply the four robots 22*a*, 22*b*, 22*c*, 22*d* without interfering with each other and still allowing for a full range of motion for the cables 36*a*, 36*b*, 36*c*, 36*d*.

The shape of the work platform 20 helps to guide the cable carrier system 28. In addition, sections of the cables 36*a* and 36*c* are pinned at 28*a* and sections of the cables 36*b* and 36*d* are pinned at 28*b*, where they crossover, in order to pivot, which allows the cables 36*a*, 36*b*, 36*c*, 36*d* to go from a minimum to maximum radius without sliding from the pinned locations at 28*a*, 28*b*, which keeps the correct amount of cable 36*a*, 36*b*, 36*c*, 36*d* in place at all times. The pinning of the cables 36*a*, 36*b*, 36*c*, 36*d* at 28*a*, 28*b* prevents the cables 36*a*, 36*b*, 36*c*, 36*d* from slipping backward through the crossover area and interfering with any opposing set of cables 36*a*, 36*b*, 36*c*, 36*d*.

The cables 36*a*, 36*b* or 36*c*, 36*d* for the robots 22*a*, 22*b* or 22*c*, 22*d* on a first side of the work platform 20 are fed in from a second side of the work platform 20 opposite the first side of the work platform 20 at a first end of the work platform 20, and the cables 36*a*, 36*b* or 36*c*, 36*d* for the robots 22*a*, 22*b* or 22*c*, 22*d* on the second side of the work platform 20 are fed in from the first side of the work platform 20 opposite the second side of the work platform 20 at the first end of the work platform 20. For example, the cables 36*a*, 36*b* for the two robots 22*a*, 22*b* on a right-side of the work platform 20 lay on the base platform 18 and are fed in from a left-side of the base platform 18 at the front end 20*a* of the work platform 20. The cables 36*c*, 36*d* for the two robots 22*c*, 22*d* on the left-side of the work platform 20 are fed in from the right-side of the work platform 20 at the front end 20*a* of the work platform 20.

In the cable carrier system 28, the cables 36*a*, 36*b*, 36*c*, 36*d* are crisscrossed to communicate with the robots 22*a*, 22*b*, 22*c*, 22*d*, so that the cables 36*a*, 36*b*, 36*c*, 36*d* flow from adjacent the front end 20*a* on one side of the work platform 20 to adjacent the back end 20*b* and the front end 20*a* on an opposite side of the work platform 20. For example, cable 36*a* connects to robot 22*a*; cable 36*b* connects to robot 22*b*; cable 36*c* connects to robot 22*c*; and cable 36*d* connects to robot 22*d*. Cables 36*a* and 36*b* flow from adjacent the front end 20*a* of the work platform 20 on the left-side of the work platform 20 to adjacent the back end 20*b* and the front end 20*a* of the work platform 20 on the right-side of the work platform 20. Cables 36*c* and 36*d* flow from adjacent the front end 20*a* of the work platform 20 on the right-side of the work platform 20 to adjacent the back end 20*b* and the front end 20*a* of the work platform 20 on the left-side of the work platform 20.

The cables 36*a*, 36*b*, 36*c*, 36*d* are stacked and nested so that a first one of the cables 36*a*, 36*b* or 36*c*, 36*d* can reach any location aft (towards the back end 20*b*) of a second one of the cables 36*b*, 36*a* or 36*d*, 36*c*, and the second one of the cables 36*a*, 36*b* or 36*c*, 36*d* can reach any location forward (towards the front end 20*a*) of the first one of the cables 36*b*, 36*a* or 36*d*, 36*c*. For example, the cables 36*a*, 36*b* are stacked and nested so that the cable 36*a* can reach any location aft (towards the back end 20*b*) of the cable 36*b* and the cable 36*b* can reach any location forward (towards the front end 20*a*) of the cable 36*a*. Similarly, the cables 36*c*, 36*d* are stacked and nested so that the cable 36*c* can reach any location aft (towards the back end 20*b*) of the cable 36*d* and the cable 36*d* can reach any location forward (towards the front end 20*a*) of the cable 36*c*.

In addition, the cables 36*a*, 36*b*, 36*c*, 36*d* are stacked and nested, so that on each side of the work platform 20, a first one of the robots 22*a*, 22*b*, 22*c*, 22*d* can travel towards a first end (20*a* or 20*b*) of the work platform 20, while a second one of the robots 22*a*, 22*b*, 22*c*, 22*d* travels towards a second end (20*b* or 20*a*) of the work platform 20, without the cables 36*a*, 36*b*, 36*c*, 36*d* interfering with each other. For example, one robot 22*a* can travel towards the front end 20*a* of the work platform 20, while another robot 22*b* travels towards the back end 20*b* of the work platform 20, without the cables 36*a*, 36*b* interfering with each other; and one robot 22*c* can travel towards the front end 20*a* of the work platform 20, while another robot 22*d* travels towards the back end 20*b* of the work platform 20, without the cables 36*c*, 36*d* interfering with each other.

Otherwise, there would be the problem of potential restriction of movement of the four robots 22*a*, 22*b*, 22*c*, 22*d*. Current cable track systems do not nest and stack in a crossing pattern to provide the full reach that is required in this configuration. The cable carrier system 28 allows for the cables 38, 38*b*, 38*c*, 38*d* to be connected to the robots 22*a*, 22*b*, 22*c*, 22*d* in a very small workspace while not interfering with each other.

FIG. 7 is another view of the gantry 24 on one side of the work platform 20 (not shown), as well as the individual support stands 26*a*, 26*b* attached to the gantry 24, with the robots 22 omitted. In designing the gantry 24, the need was identified to independently position two robots 22 by using only a single gantry 24. Current systems only allow for one robot to be positioned along a gantry. This system allows for independent control to drive both robots 22 to specified locations on a single gantry 24 using high precision.

The gantry 24 includes a plurality of drive belts 46a, 46b for independently positioning the individual support stands 26a, 26b (and the robots 22 placed thereon). In one embodiment, there are two belts 46a, 46b running along the length of the gantry 24, wherein the two belts 46a, 46b are positioned vertically with respect to each other. In one embodiment, the top belt 46a drives the aft individual support stand 26a, and the bottom belt 46b drives the forward individual support stand 26b, although this may be reversed in other embodiments.

Each of the individual support stands 26a, 26b on one side of the work platform 20 are moved laterally along the side of the work platform 20 via the drive belts 46a, 46b. Specifically, the drive belts 46a, 46b allow each of the individual support stands 26a, 26b to travel the length of the work platform 20, except for the space occupied by the other individual support stand 26a, 26b, on one side of the work platform 20.

Each of the individual support stand 26a, 26b includes a base 48 that extends underneath the main square support tube 42 of the gantry 24 to counter-balance the individual support stand 26a, 26b (and the robot 22 placed thereon).

The main square support tube 42 is comprised of two guide rails 50a, 50b, comprising an upper guide rail 50a and a lower guide rail 50b. Each of the individual support stands 26a, 26b includes a bracket 52 that mounts the base 48 to the guide rails 50a, 50b of the gantry 24 to provide for movement and support of the individual support stand 26a, 26b (and the robot 22 placed thereon).

Each of the individual support stands 26a, 26b are cantilevered from the rails 50a, 50b, so that the individual support stand 26a, 26b (and the robot 22 placed thereon) are supported from an inboard side of the gantry 24, and the weight of the individual support stand 26a, 26b and the robots 22 does not affect either the base platform 18 during positioning of the fuselage assembly 14 or the work platform 20.

The bracket 52 of the individual support stands 26a, 26b also includes one or more bearing blocks 54a, 54b that are attached to both ends of one of the drive belts 46a, 46b. A belt tensioning mechanism 56 connects the bearing blocks 54a, 54b and ensures that a proper tension is maintained on the drive belt 46a, 46b.

Cables 36 for the robots 22 are supported by the base 48 of the individual support stand 26a, 26b, and are routed through an aperture 58 in the bracket 52 of the individual support stand 26a, 26b to the robot 22 placed thereon.

FIG. 8 is another view of the gantry 24 on one side of the work platform 20, as well as the individual support stands 26 attached to the gantry 24, showing details of the dual drive belt 46a, 46b.

In one embodiment, each of the belts 46a, 46b includes a motor 60a, 60b, and one or more pulleys 62a, 62b. Specifically, the top belt 46a is driven by pulley motor 60a, wherein the belt 46a is wrapped around pulleys 62a, and the bottom belt 46b is driven by pulley motor 60b, wherein the belt 46b is wrapped around pulleys 62b. Pulleys 62a, 62b are used so that the drive motors 60a, 60b are positioned near a forward end of the work platform 20 for ease of access for maintenance via access panels 44. A similar configuration of pulleys 62a, 62b are positioned at the other end of the gantry 24, but without the motors 60a, 60b.

The forward sides of the belts 46a, 46b are exposed on the main square support tube 42 between the upper rail guide 50a and lower rail guide 50b. The return sides of the belts 46a, 46b are internal to the main square support tube 42.

Finally, cabling 36 for the robot 22 lays in the base 48, threads through the aperture 58 in the bracket 52, and extends underneath the lower guide rail 50b as well as the belts 46a, 46b.

Airplane Assembly

Embodiments of the disclosure may be described in the context of an aircraft manufacturing and service method 64 comprised of steps 66-78 as shown in FIG. 9 and an aircraft 80 comprised of components 82-94 as shown in FIG. 10.

As shown in FIG. 9, during pre-production, exemplary method 64 may include specification and design 66 of the aircraft 80 and material procurement 68. During production, component and subassembly manufacturing 70 and system integration 72 of the aircraft 80 takes place. Thereafter, the aircraft 80 may go through certification and delivery 74 in order to be placed in service 76. While in service 76 by a customer, the aircraft 80 is scheduled for routine maintenance and service 78 (which includes modification, reconfiguration, refurbishment, and so on). The base platform 18, work platform 20, robots 22 and other elements as described herein can be used at least in steps 70 and 72 of method 64.

Each of the processes of method 64 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 10, the aircraft 80 produced by exemplary method 64 may include an airframe 82 with a plurality of systems 84 and an interior 86. Examples of high-level systems 84 include one or more of a propulsion system 88, an electrical system 90, a hydraulic system 92, and an environmental system 94. Any number of other systems may be included. Although an aerospace example is shown, the principles of the disclosure may be applied to other industries, such as the automotive industry.

Apparatus and methods embodied herein may be employed during any one or more of the stages of the production method 64. For example, components or subassemblies corresponding to production process 70 may be fabricated or manufactured in a manner similar to components or subassemblies produced while the aircraft 80 is in service 76. Also, one or more apparatus embodiments, method embodiments, or a combination thereof may be utilized during the production stages 70 and 72, for example, by substantially expediting assembly of or reducing the cost of an aircraft 80. Similarly, one or more of apparatus embodiments, method embodiments, or a combination thereof may be utilized while the aircraft 80 is in service 76, for example and without limitation, to maintenance and service 78.

Alternatives

The description of the examples set forth above has been presented for purposes of illustration and description, and is not intended to be exhaustive or limited to the examples described. Many alternatives, modifications and variations may be used in place of the specific elements described above.

What is claimed is:

1. An apparatus, comprising:
a work platform for supporting one or more humans positioned above a base platform for supporting one or more robots independently of the work platform; and a cable carrier system for providing cables to the robots at non-static locations, wherein:

the cable carrier system is positioned on or above the base platform and underneath the work platform;

the cable carrier system provides the cables to the robots in a crossover configuration in a space between the work platform and the base platform; and the cable carrier system provides for stacking and nesting the cables on each of a first and second side of the work platform, so that the cables independently supply the robots without the cables interfering with each other as the robots travel along the work platform, while allowing for a full range of motion for the cables.

2. The apparatus of claim 1, wherein the cable carrier system provides separate ones of the cables to a plurality of the robots.

3. The apparatus of claim 2, wherein the cables comprise at least one of power, control, communications, parts supply and return, for the plurality of robots.

4. The apparatus of claim 1, wherein the cables are crisscrossed to communicate with the robots, so that the cables flow from adjacent a forward end on the first side of the work platform to adjacent an aft end on the second side of the work platform.

5. The apparatus of claim 1, wherein the cable carrier system provides for stacking and nesting the cables on each side of the work platform, so that a first one of the robots travels towards a first end of the work platform, while a second one of the robots travels towards a second end of the work platform, without interfering with each other.

6. The apparatus of claim 5, wherein the cable carrier system provides for stacking and nesting the cables on each side of the work platform, so that a first one of the cables reaches any location aft of a second one of the cables and the second one of the cables reaches any location forward of the first one of the cables.

7. The apparatus of claim 1, wherein the cables or the robots on the first side of the work platform are fed in from the second side of the work platform opposite the first side of the work platform at a first end of the work platform.

8. The apparatus of claim 7, wherein the cables for the robots on the second side of the work platform are fed in from the first side of the work platform opposite the second side of the work platform at the first end of the work platform.

9. The apparatus of claim 1, wherein the work platform is mounted on one or more risers above the base platform, and the risers include a support section for the cables, thereby holding the cables away from an opposite side of the work platform to allow for a double bend in the cables, in order to allow the robots to reach all available positions and for the cables to be fully extended and retracted as the robots are positioned.

10. The apparatus of claim 9, wherein at least portions of the cables residing on the support section are secured thereon.

11. The apparatus of claim 1, wherein sections of the cables are pinned where they crossover in order to pivot.

12. The apparatus of claim 11, wherein the sections of the cables are pinned to allow the cables to go from a minimum radius to a maximum radius without sliding from pinned locations to keep an amount of cable in place.

13. The apparatus of claim 11, wherein the sections of the cables are pinned to prevent the cables from slipping backward through a crossover area and interfering with any opposing set of cables.

14. The apparatus of claim 1, wherein the work platform for supporting the humans is isolated from base platform for supporting the robots to provide stabilized positioning of the robots, so that the base platform and work platform together provide a collaborative workspace for the robots and the humans.

15. The apparatus of claim 1, wherein the work platform is supported by one or more risers mounted on the base platform at one end and is coupled to an independent support structure at another end, in order to provide isolated support for movement thereon, without imparting any motion to the robots, thereby eliminating positioning errors caused by flexing, vibrations or fluctuations in the work platform's height due to movement of the work platform.

16. A method, comprising:

positioning a work platform for supporting one or more humans above a base platform for supporting one or more robots independently of the work platform; and positioning a cable carrier system for providing cables to the robots at non-static locations, wherein:

the cable carrier system is positioned on or above the base platform and underneath the work platform;

the cable carrier system provides the cables to the robots in a crossover configuration in a space between the work platform and the base platform; and the cable carrier system provides for stacking and nesting the cables on each of a first and second side of the work platform, so that the cables independently supply the robots without the cables interfering with each other as the robots travel along the work platform, while allowing for a full range of motion for the cables.

17. The method of claim 16, wherein the cable carrier system provides separate ones of the cables to a plurality of the robots.

18. The method of claim 17, wherein the cables comprise at least one of power, control, communications, parts supply and return, for the plurality of robots.

19. The method of claim 16, wherein the cables are crisscrossed to communicate with the robots, so that the cables flow from adjacent a forward end on the first side of the work platform to adjacent an aft end on the second side of the work platform.

20. The method of claim 16, wherein the cable carrier system provides for stacking and nesting the cables on each side of the work platform, so that a first one of the robots travels towards a first end of the work platform, while a second one of the robots travels towards a second end of the work platform, without interfering with each other.

21. The method of claim 20, wherein the cable carrier system provides for stacking and nesting the cables on each side of the work platform, so that a first one of the cables reaches any location aft of a second one of the cables and the second one of the cables reaches any location forward of the first one of the cables.

22. The method of claim 16, wherein the cables for the robots on the first side of the work platform are fed in from the second side of the work platform opposite the first side of the work platform at a first end of the work platform.

23. The method of claim 22, wherein the cables for the robots on the second side of the work platform are fed in from the first side of the work platform opposite the second side of the work platform at the first end of the work platform.

24. The method of claim 16, wherein the work platform is mounted on one or more risers above the base platform, and the risers include a support section for the cables, thereby holding the cables away from an opposite side of the work platform to allow for a double bend in the cables, in order to allow the robots to reach all available positions and for the cables to be fully extended and retracted as the robots are positioned.

25. The method of claim 24, wherein at least portions of the cables residing on the support section are secured thereon.

26. A method for assembly of an aircraft fuselage, comprising:
  positioning a work platform for supporting one or more humans within the fuselage assembly above a base platform for supporting one or more robots independently of the work platform within the fuselage assembly; and
  positioning a cable carrier system for providing cables to the robots at non-static locations within the fuselage assembly, wherein:
  the cable carrier system is positioned on or above the base platform and underneath the work platform;
  the cable carrier system provides the cables to the robots in a crossover configuration in a space between the work platform and the base platform; and
  the cable carrier system provides for stacking and nesting the cables on each of a first and second side of the work platform, so that the cables independently supply the robots without the cables interfering with each other as the robots travel along the work platform, while allowing for a full range of motion for the cables.

* * * * *